(12) United States Patent
Kayashima et al.

(10) Patent No.: US 6,195,366 B1
(45) Date of Patent: Feb. 27, 2001

(54) NETWORK COMMUNICATION SYSTEM

(75) Inventors: Makoto Kayashima, Yamato; Masato Terada, Sagamihara; Tatsuya Fujiyama; Eri Katoh, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/065,416

(22) Filed: Apr. 24, 1998

(30) Foreign Application Priority Data

Apr. 25, 1997 (JP) ..................................................... 9-108839

(51) Int. Cl.$^7$ ...................................................... H04J 3/24
(52) U.S. Cl. .......................... 370/475; 370/401; 709/227; 709/238; 709/245
(58) Field of Search .................................... 370/254, 257, 370/400, 401, 410, 411, 475; 709/201, 203, 217, 218, 219, 220, 221, 222, 227, 228, 238, 242, 245

(56) References Cited

U.S. PATENT DOCUMENTS 5,845,267 * 12/1998 Ronen ..................................... 705/40
6,006,258 * 12/1999 Kalajan ................................. 709/219
6,006,268 * 12/1999 Coile et al. ........................... 709/227

\* cited by examiner

Primary Examiner—Ricky Ngo
(74) Attorney, Agent, or Firm—Antonelli, Terry, Stout & Kraus, LLP

(57) ABSTRACT

A method of conducting a connectionless communication in a network communication system including a client, a server, and a plurality of proxy servers which are disposed on a transmission path between the client and server. The communication is accomplished by use of specification of a communication address thereof and a port number dynamically assigned by the computer. (a) The server transmits own communication address and own port number to the client. (b) The client transmits own communication address and own port number as well as the communication address and port number of the server to a first adjacent proxy server computer. (c) The N-th (N≧1) proxy server transmits own communication address and own server side port number as well as the communication address and the port number of the server to an (N+1)-st proxy server. (d) step (e) is repeatedly executed by incrementally increasing N until the (N+1)-th proxy server becomes a terminal proxy server. (e) The terminal proxy server transmits its own communication address and its server and client side port numbers to the N-th proxy server. (f) The N-th proxy server sends own communication address and own client side port number and the communication address and the server side port number of the terminal proxy server to the (N−1)-th proxy server when N≧2 or the client when N=1. (g) step (f) is repeatedly executed by incrementally increasing N until N becomes one. (h) The client transmits a communication address and a server side port number of the proxy server to the server. (i) The connectionless communication is commenced after all computers acquire a communication address and an associated port number of each of the computers adjacent thereto.

20 Claims, 15 Drawing Sheets

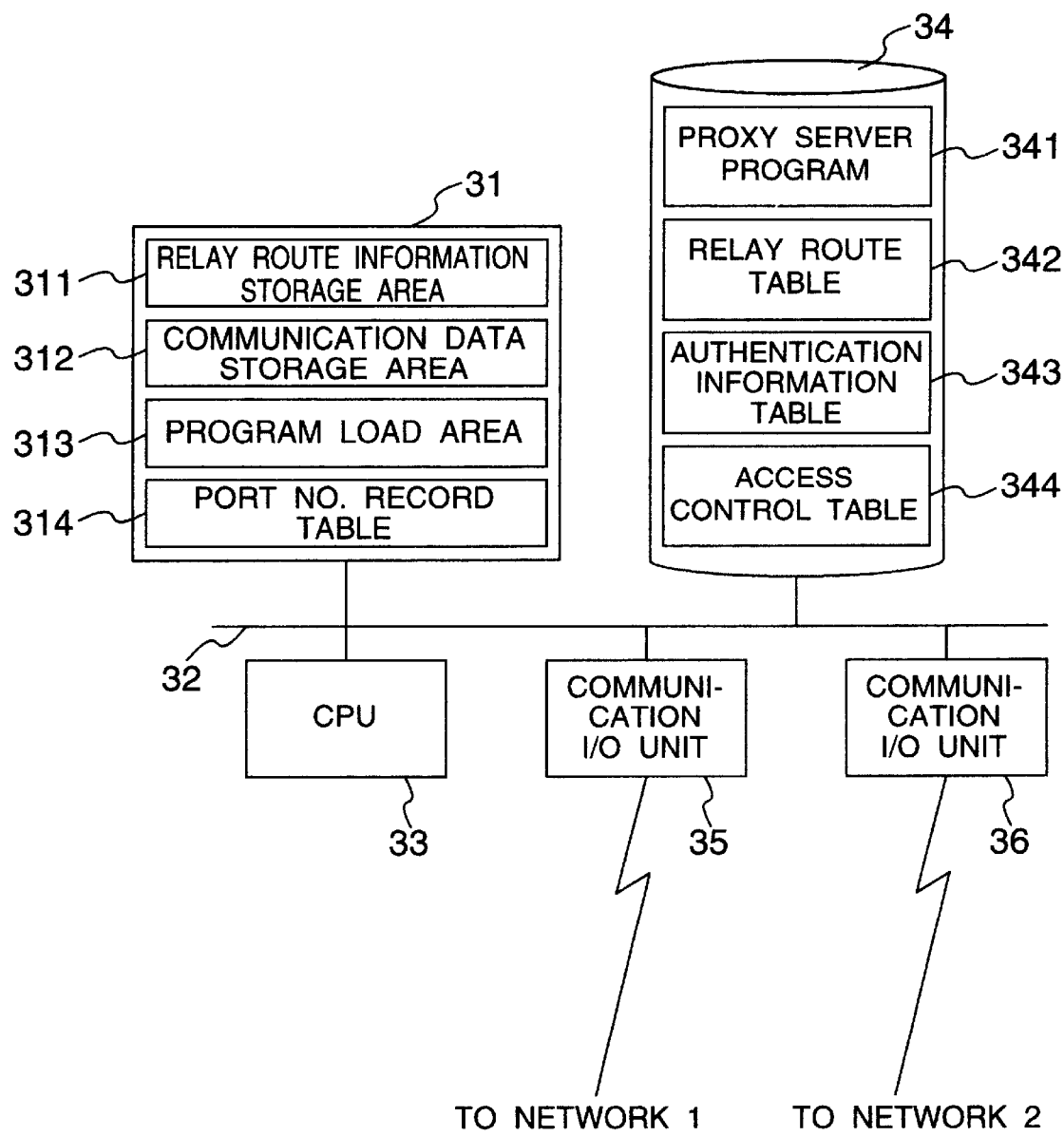

| | USER ID | ORIGINATION IP ADDRESS | PORT NO. |
|---|---|---|---|
| | WHITE | 192.168.1.1 | 1081 |
| | GREEN | 192.168.2.1 | 1082 |
| | SMITH | 192.168.3.1 | 1081 |
| | | | |

3441 3442 3443 (column labels); 344 (table label)

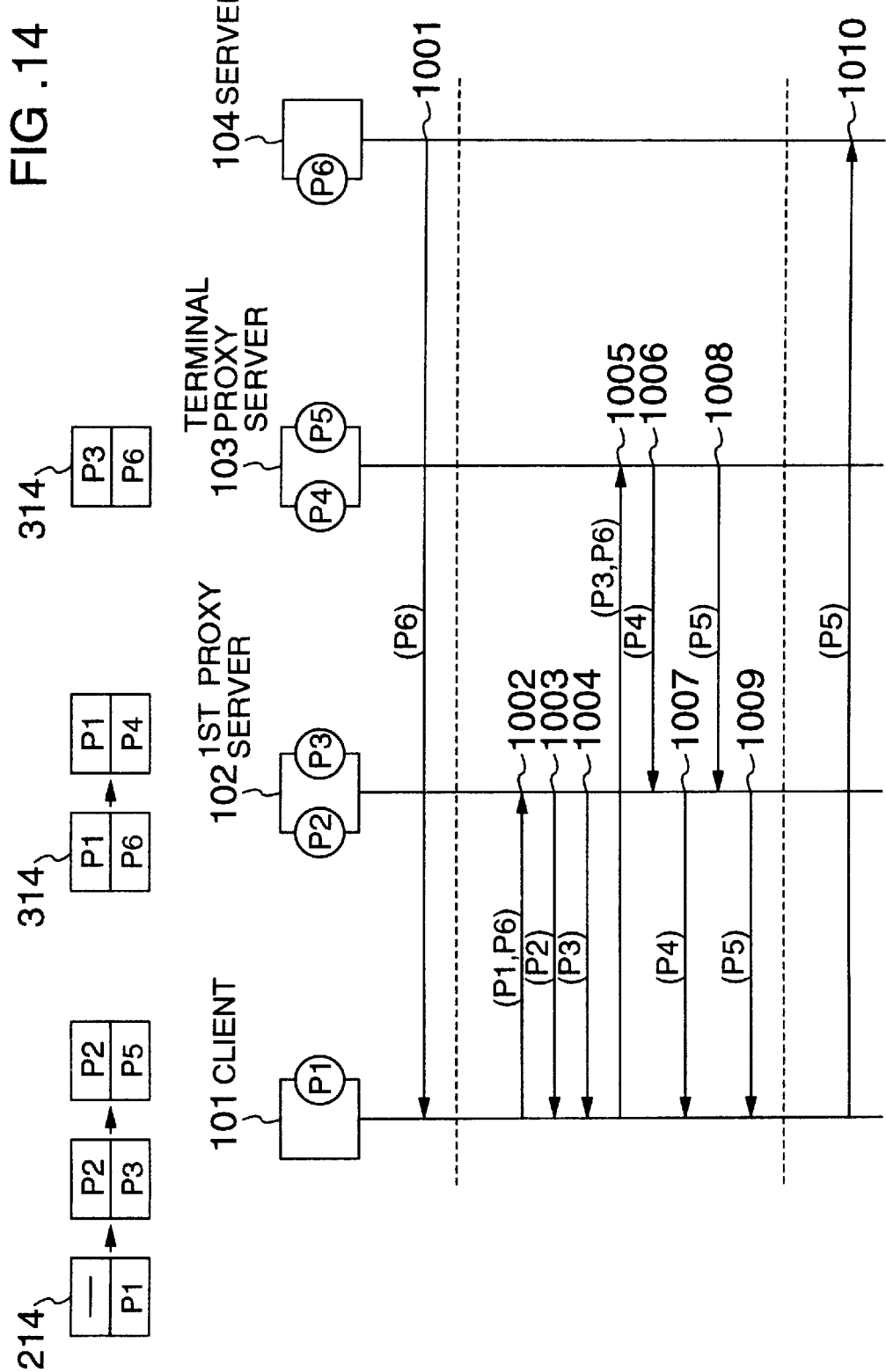

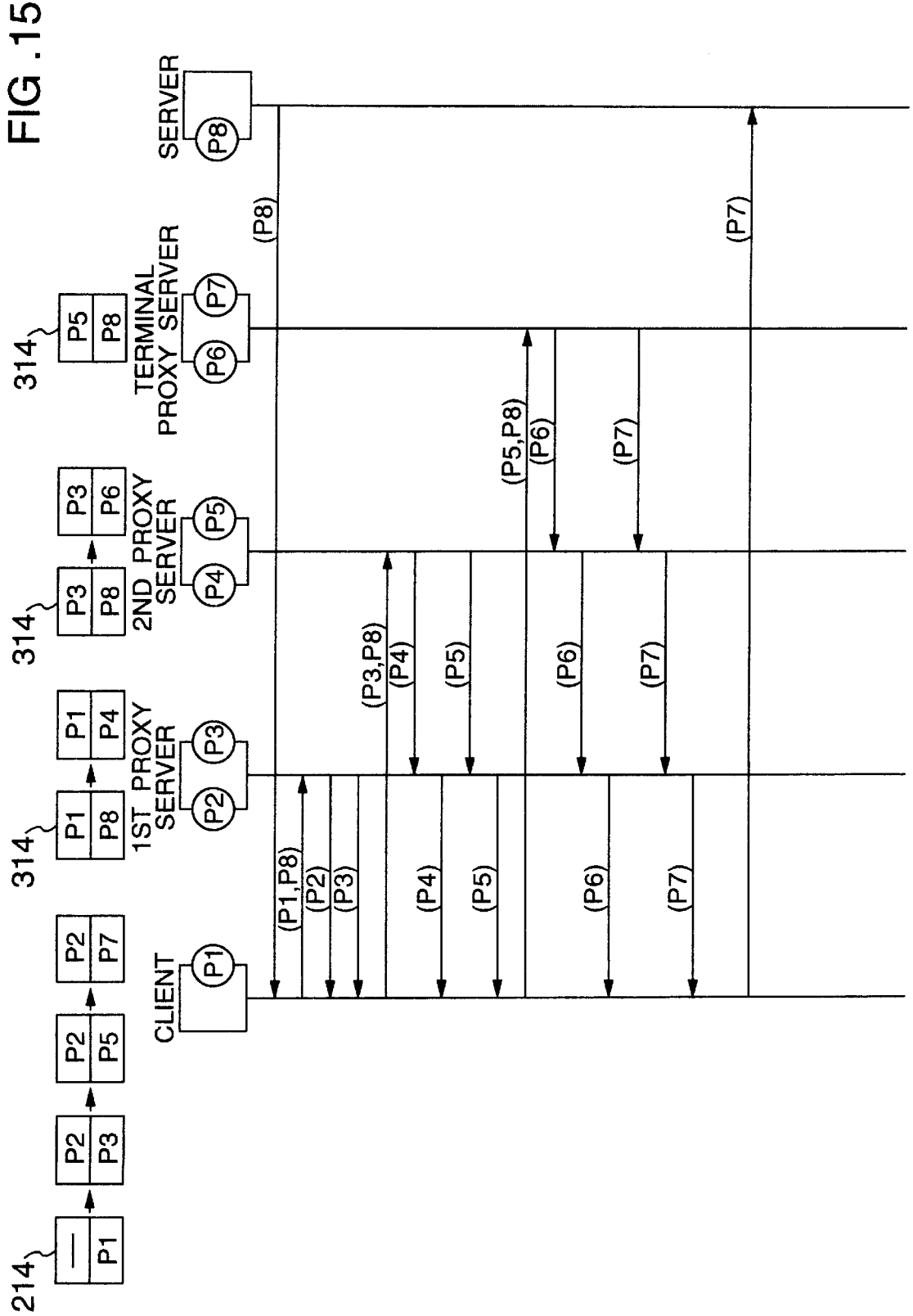

NETWORK COMMUNICATION SYSTEM

CROSS-REFERENCE TO RELATED APPLICATION

The present application relates to U.S. patent application Ser. No. 08/884,133 filed on Jun. 27, 1997 and assigned to the present assignee, now U.S. Pat. No. 6,111,883. The content of that application is incorporated herein by reference

BACKGROUND OF THE INVENTION

1. Field of the Invention

The present invention relates to a network in which a plurality of proxy servers, each server constituting a fire wall, are disposed in communication paths between a client computer and a server computer, and in particular, to a communication system in which a connectionless communication using specifications of port numbers are carried out between the client and server computers.

2. Description of the Related Art

In a communication network employing a transmission control protocol/Internet protocol (TCP/IP), there has been proposed a communication system in which proxy servers functioning as firewalls are provided on a communication route such that communications are relayed through a transport layer which identifies a service in accordance with a port number and a communication address. The communications in the transport layer are primarily classified into communications respectively using the transmission control protocol (TPC) and a user datagram protocol (UDP).

In the connection-oriented communication, the port number of a transmission destination and that of a transmission destination at a communication starting point are assumed to be fixed. Therefore, each communication facility can easily acquire information necessary to establish a relay or transit route.

However, In the connectionless communication, the port number of a transmission destination and that of a transmission destination at a communication starting point are assumed to be indefinite. Consequently, it is difficult for each communication facility to obtain information necessary to establish a transit route.

Heretofore, Socks Protocol Version 5 proposed by RFC1928 has been known as a function to support a connectionless communication between client and server computers in an environment using firewalls. SOCKS Protocol Version 5 is a protocol prepared for a system including proxy servers relaying communications on firewalls and communication libraries for including the proxy servers. This protocol stipulates mutual authentication between a proxy server and a communication library in a client computer and sequences and packet formats for an instruction to establish connection to the proxy server of client computer and notification of results of instruction.

To conduct a connectionless communication, it is required for the client computer, server computer, and proxy server to mutually exchange port numbers thereof used in the communication. The protocol of Socks Version 5 assumes that a server computer can notify a port number thereof to be used for communication to a client computer through a predetermined operation. Moreover, a port used by the client computer can be reported to the server computer by a proxy server communicating with the server computer. Under this condition, Socks Protocol Version 5 provides a communication procedure to notify the port used by the server computer from the client computer to the proxy server and a procedure to report two ports used by the proxy server respectively for the client and server computers from the proxy server to the client computer.

For example, in a case in which only one proxy server forming a firewall is disposed on a communication route between client and server computers, port numbers are exchanged therebetween through a sequence shown in FIG. 16A. First, the server computer reports port number P4 for communication with the proxy server to the client computer. The client computer then passes P4 to the proxy server. The proxy server returns to the client computer port number P2 for communication with the client computer and port number P3 for communication with the server computer. Finally, the client computer notifies port number P3 to the server computer.

However, in the conventional sequence of Socks Version 5, the port number exchange cannot be appropriately accomplished when a plurality of proxy servers are arranged to configure firewalls on the communication route.

In a situation in which two proxy servers 1 and 2 exist on the route, the exchange operation is conducted, for example, as shown in FIG. 16B and as follows. A server computer first notifies port number P6 for communication with a proxy server 2 to a client computer. Thereafter, port number P6 is sequentially reported to the proxy servers 1 and 2. In accordance with the notification, the proxy server 1 sends two port numbers P2 and P3 for its communication to the client computer. Similarly, the proxy server 2 sends two port numbers P4 and P5 to the proxy server 1. However, information notified from the proxy server 2 is interrupted by a firewall function of the proxy server 1. Reported to the server computer is port number P3, not the port number (P5) necessary for the connectionless communication.

SUMMARY OF THE INVENTION

It is therefore an object of the present invention to provide a network communication system in which port numbers can be exchanged in a connectionless communication even when a communication between computers is relayed by a plurality of proxy servers respectively configuring firewalls.

To achieve the object above in accordance with the present invention, there is provided a method of conducting a connectionless communication in a network communication system including a client computer, a server computer, and a plurality of proxy server computers being disposed on a transmission path between the client and server computers and forming firewalls in which each computer carries out communication with specification of a communication address thereof and a port number dynamically assigned by the computer. The method comprises step (a) that the server computer transmits own communication address and own port number to the client computer, step (b) that the client computer transmits own communication address and own port number as well as the received communication address and port number of the server computer to a first adjacent proxy server computer, step (c) that the N-th proxy server computer ($N \geq 1$) transmits own communication address and own server side port number and the received communication address and port number of the serve computer to an (N+1)-th proxy server computer adjacent thereto on the server computer side, step (d) that step (c) is repeatedly executed while incrementally increasing N until the (N+1)-th proxy server becomes a terminal proxy server computer, step (e) that the terminal proxy server computer transmits own communication address and own client side port number as well as own communication address and own server side port number to an N-th proxy serve computer adjacent thereto on the client side, step (f) that the N-th proxy serve computer transmits own communication address and own client side port number as well as a communication address and a server side port number of the terminal proxy server computer to an (N−1)-th proxy serve computer adjacent thereto on the client side for N≧2 or the client computer for N 1, step (g) that step (f) is repeatedly executed while conducting decrement of N until N becomes one, step (h) that the client computer transmits the communication address and the server side port number of the terminal proxy server computer to the server computer, and step (i) that a connectionless communication is commenced after all computers acquire computer addresses and associated port numbers of adjacent computers thereof.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein:

FIG. 3 is a diagram showing constitution of a proxy server computer;

FIG. 14 is a diagram showing a concrete example of the communication sequence in accordance with the second embodiment of the present invention;

FIG. 15 is a specific example of the communication sequence in a case in which three proxy servers exist in a system in accordance with the second embodiment of the present invention.

DESCRIPTION OF THE PREFERRED EMBODIMENTS

Referring now to FIGS. 1 to 3, FIGS. 4A and 4B, and FIGS. 5 to 15, description will be given of embodiments in accordance with the present invention.

(1) Configuration

Figure 1:
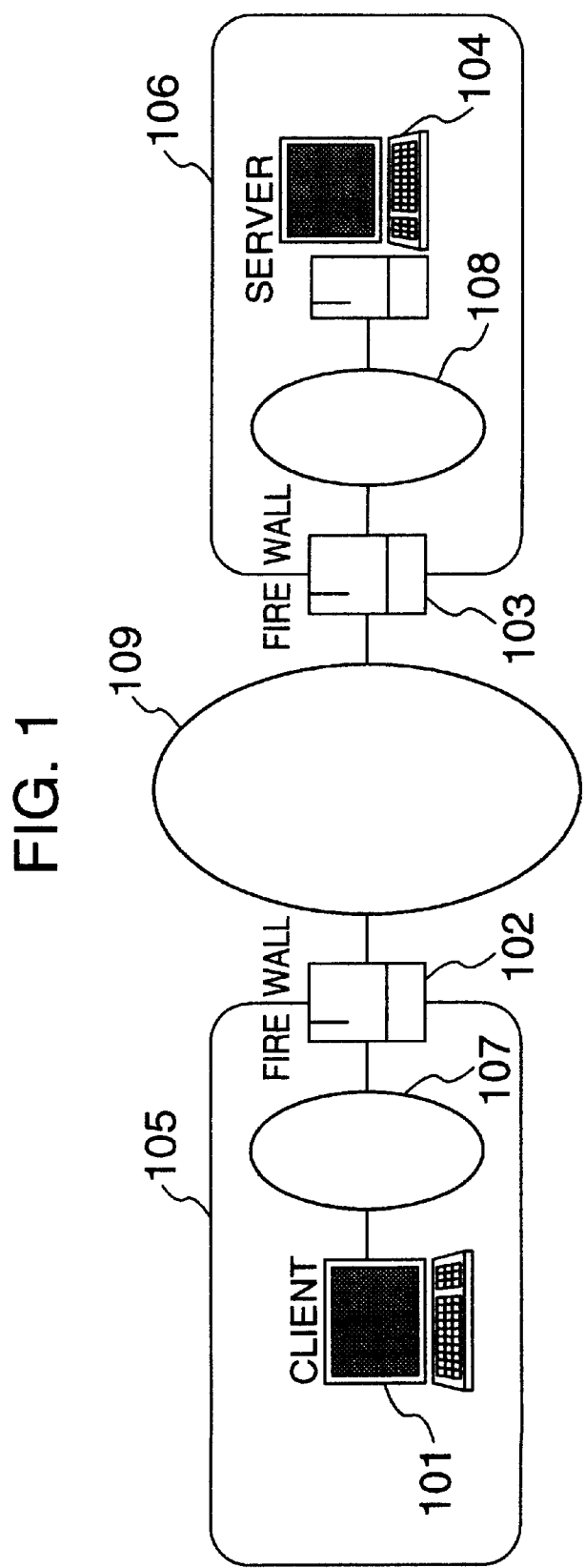
FIG. 1 is a diagram showing an overall configuration of an embodiment of a network communication system in accordance with the present invention.

FIG. 1 shows an outline of an embodiment of a network communication system of the present invention. The configuration of FIG. 1 includes a client computer 101, proxy servers 102 and 103 forming firewalls, a server computer 104, network domains 105 and 106 protected by the respective firewalls, local segments 107 and 108, and the Internet 109. Each of the proxy servers 102 and 103 of this example includes an authentication function and an access control function and works as a firewall. It may also be possible that the proxy server functions are limited such that one firewall is formed by a plurality of computers including proxy servers.

The client computer 101 communicates with the server computer 104 via a local area network (LAN) of the local segment 107, the proxy server 102, the Internet 109, the proxy server 103, and a local area network (LAN) of the local segment 108. Utilized between the computers 102 and 104 are two kinds of communication schemes including a connection-oriented communication using a transmission control protocol (TCP) and a connectionless communication utilizing a user datagram protocol (UDP). Each of the computers 101 to 104 can accomplish the connection-oriented communication with a predetermined port number. Furthermore, specifying a communication address (IP address) and a port number dynamically assigned in each connection, the computer can carry out the connectionless communication.

When a plurality of proxy servers are disposed on a communication path, it is necessary to discriminate the proxy servers from each other. Namely, a proxy server connected to a client computer is called a first proxy server, a proxy server coupled with the first proxy server, i.e., the second proxy server relative to the client computer is called a second proxy server, a proxy server connected to the (n−1)-th proxy server, i.e., the n-th proxy server relative to the client computer is called an n-th proxy server. A proxy server linked with a server computer is also called a terminal proxy server.

Figure 2:
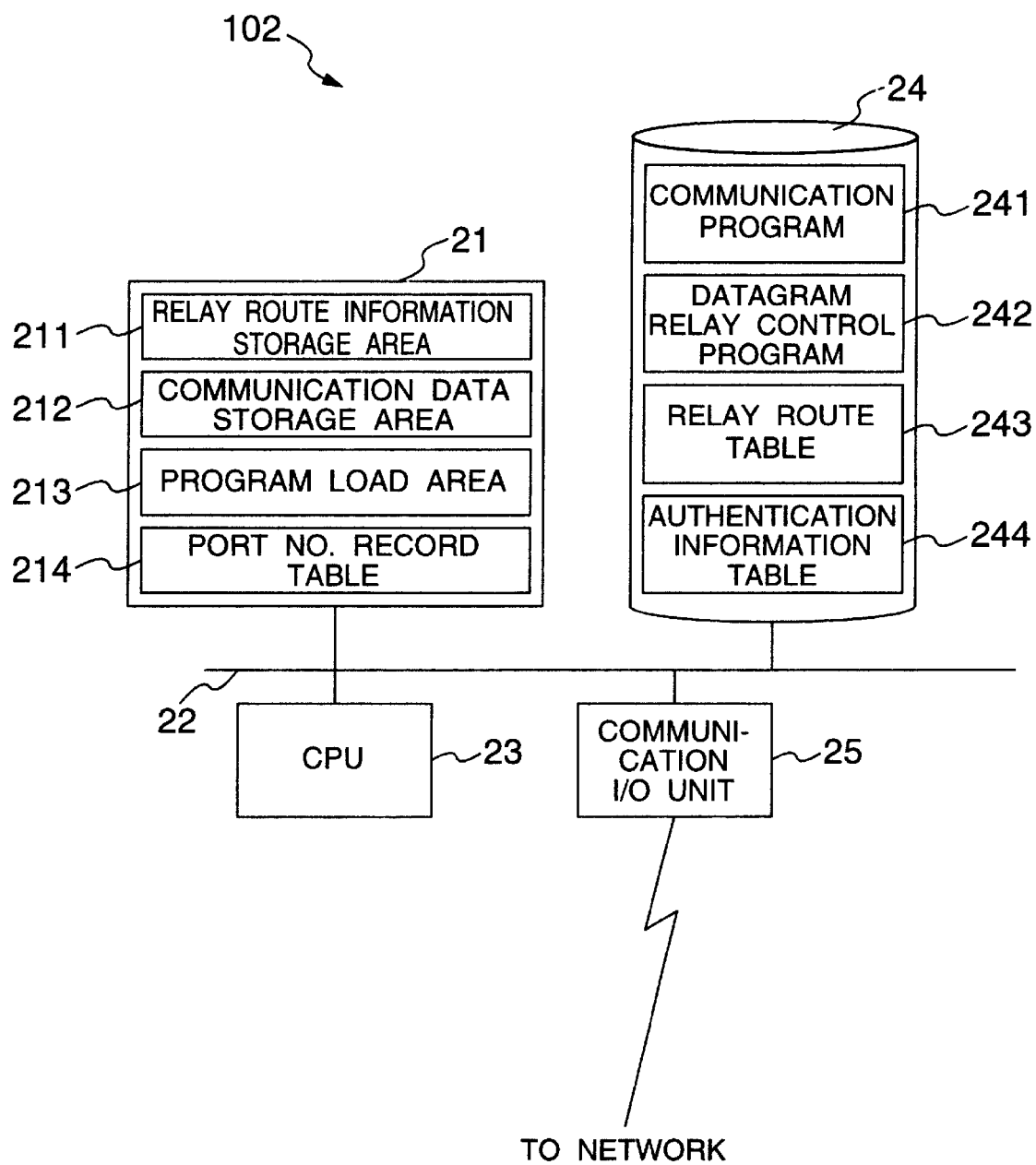
FIG. 2 is a diagram showing constitution of a client computer.

FIG. 2 shows an example of constitution of the client computer 102. In the configuration of FIG. 2, the client computer 102 includes a central processing unit 23, a memory 21, an external storage 24, a communication input/output unit 25, and a bus 22. Although not shown in this diagram, the computer 102 includes various input/output units such as a display, a keyboard, and a voice reproducing circuit as well as programs and circuits for the encryption and decryption of communication data.

Figures 5, 6:
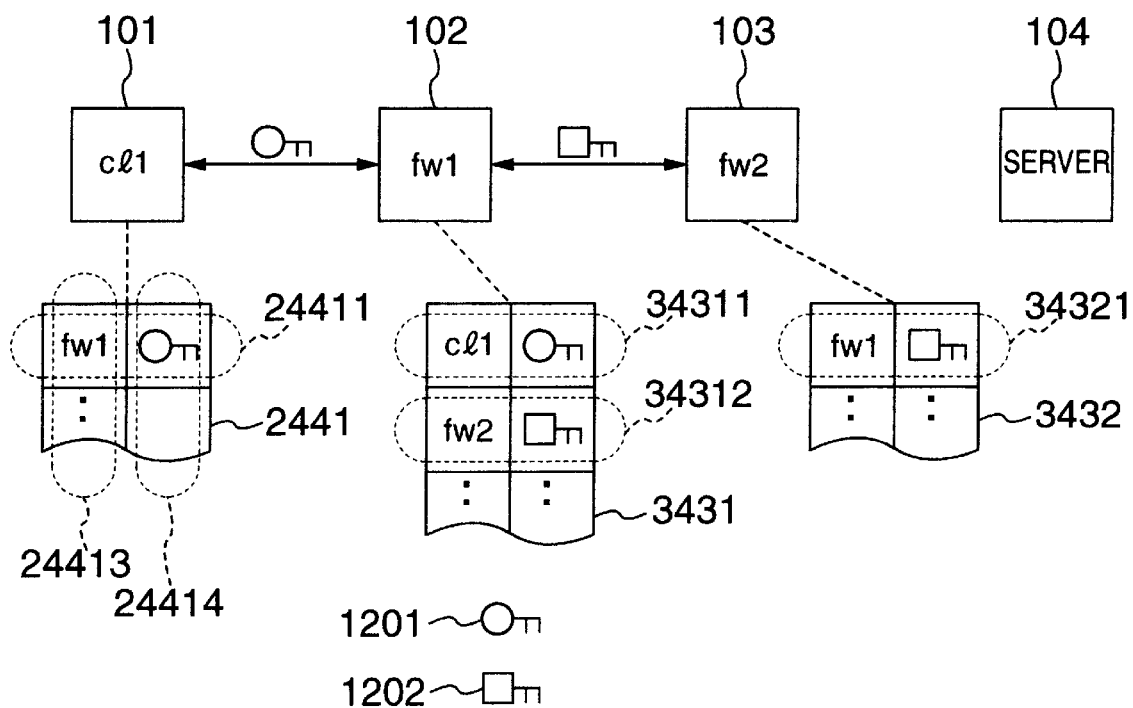
FIG. 5 is a diagram for explaining structure of an authentication information table and authentication processing in accordance with the first embodiment of the present invention.
FIG. 6 is a diagram showing a layout of an access control table.

Stored in the external storage 24 are a communication program 241, a datagram relay control program 242, a relay route table 243, an authentication information table 244, and various application program, not shown. The programs 241 and 242 are disposed to conduct the connectionless communication and the authentication and exchange of port numbers through a connection-oriented communication. The relay route table 243 includes identification information of other domains and communication addresses, port numbers, etc. for communication therewith. In the authentication information table 244, there are recorded identifiers (ID) of proxy servers and authentication common keys 1201 common to the proxy servers 102 as shown in FIG. 5. The application programs includes, for example, programs to reproduce received moving image data and voice data in a realtime fashion.

Figure 4A:
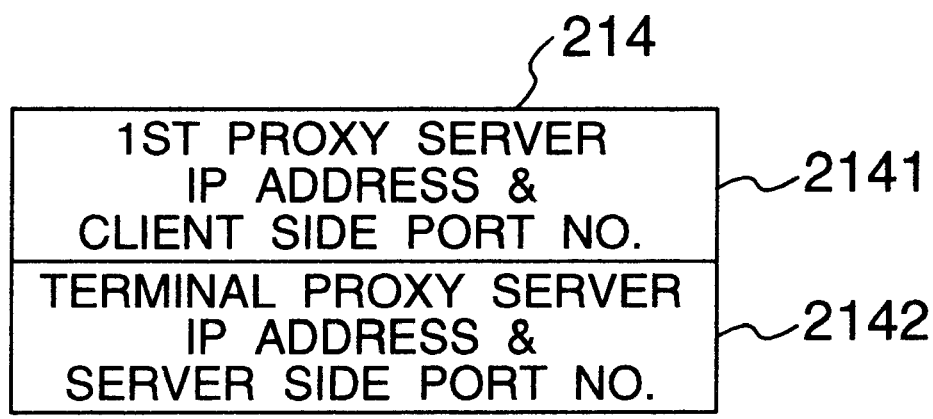
FIGS. 4A and 4B are diagrams showing port number record tables in client and proxy server computers.
Figure 4B:
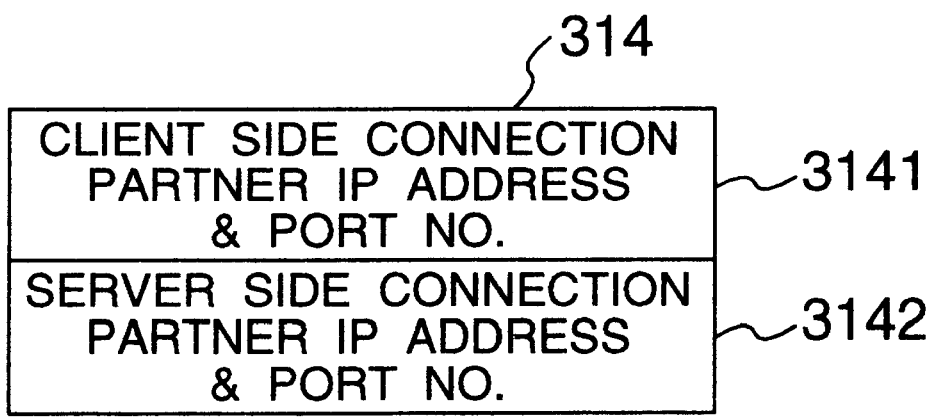

The memory 21 includes a relay route information storage area 211, a communication data storage area 212, a program load area 213, and a port number record table 214. In the areas 211 and 213, there are respectively loaded information of the relay route table 243 and various programs in the external storage 24. The port number record table 214 includes as shown in FIG. 4A a port number area 2141 in which a client side port number and a communication address of the proxy server (first proxy server) 102 connected to the client computer 101 are recorded and a port number area 2142 in which a server side port number and a communication address of the proxy server (terminal proxy server) 103 coupled with the server computer 104 are stored. For the relay route table 243 and the relay route information storage area 211, the article cited in the cross-reference described a configuration thereof and a creation method thereof. Stored in these storage are IP addresses to be relayed and information of connecting destination thereof.

The CPU 23 executes a program in the load area 213 to communicate packets via the communication I/O unit 25. At initiation of communication, the program makes a search through the record area 211 for the transmission destination. Data of a communication packet is stored in the record area 212 and a port number and a communication address attained through a connection-oriented communication are stored in the port number record area 214.

The server computer 104 is basically configured to be similar to the client computer. In addition thereto, the server 104 includes application programs, databases, and the like to provide various services for the client computer. The services also support, for example, moving image data and audio data. For these data items, a realtime transfer is more required when compared with the data reliability and hence is suitable for the connectionless communication.

FIG. 3 shows a constitution example of the proxy server (102 or 103) forming a firewall. The proxy server includes a CPU 33, a memory 31, an external storage 34, a communication I/O unit 36, and a bus 32. There may also be provided programs and circuits for the encryption and decryption of communication data depending on cases.

The external storage 34 is used to store therein a proxy server program 341, a transit or relay route table 342, an authentication information table 343, and an access control table 344. The program 341 is disposed to support a connectionless communication as well as port number exchange and authentication and access control in a connection-oriented communication. Stored in the relay route table 342 are, as described in the article of the cross-reference, identifier information of other domains and communication addresses, port numbers and the like for communications with the domains.

In the authentication information table 343, there are recorded identifiers (ID) of adjacent computers and authentication common keys shared between the computers. For the proxy server 102, the table 343 includes an entry 34311 including an identifier (c11) of the client computer 101 and an authentication common key 1201 and an entry 34312 including identifying information (fw2) and an authentication common key 1202 as shown in FIG. 5. The access control table 344 shown in FIG. 6 includes records each including a field 3441 for a user identifier, a field 3442 for an origination IP address, and a field 3443 for an origination port number.

Configured in the memory 31 are a relay route information storage area 311, a communication data storage area 312, a program load area 313, and a port number record table 314. The areas 311 and 313 are respectively loaded with information of the table 342 and programs such as the proxy server program 341. The record table 314 includes, as can be seen from FIG. 4B, a port number area 3141 in which a server side port number and a communication address of a client side connection partner are stored and a port number area 3142 in which a client side port number and a communication address of a server side connection partner are stored.

The CPU 33 executes a program in the load area 313 to communicate packets via the communication I/O facility 25. At initiation of communication, the program conducts a search through the record area 311 for the transmission destination. Data of a transmission or reception packet is stored in the record area 312 and the port number for the connectionless communication is set to the record table 314.

(2) First Embodiment

Referring now to the sequence chart of FIG. 9, description will be given of a procedure to exchange port numbers between a client computer and a plurality of proxy servers.

When conducting communication between client and server computers 102 and 104, port numbers and communication addresses are exchanged between the computers on the communication route in a connection-oriented communication. Thereafter, each computer communicates packets with specification of the obtained port number and communication address in a connectionless communication. Although two proxy servers are provided on the route in this example, the same communication procedure is applicable even when three or more proxy servers are arranged. For the connection between the client and server computers 101 and 104, there is specifically employed a control connection.

The method of utilizing the connection-oriented communication in the connectionless communication and the method of exchanging port numbers in the connectionless communication are almost the same as for SOCKS Protocol Version 5 described above.

Figure 9:
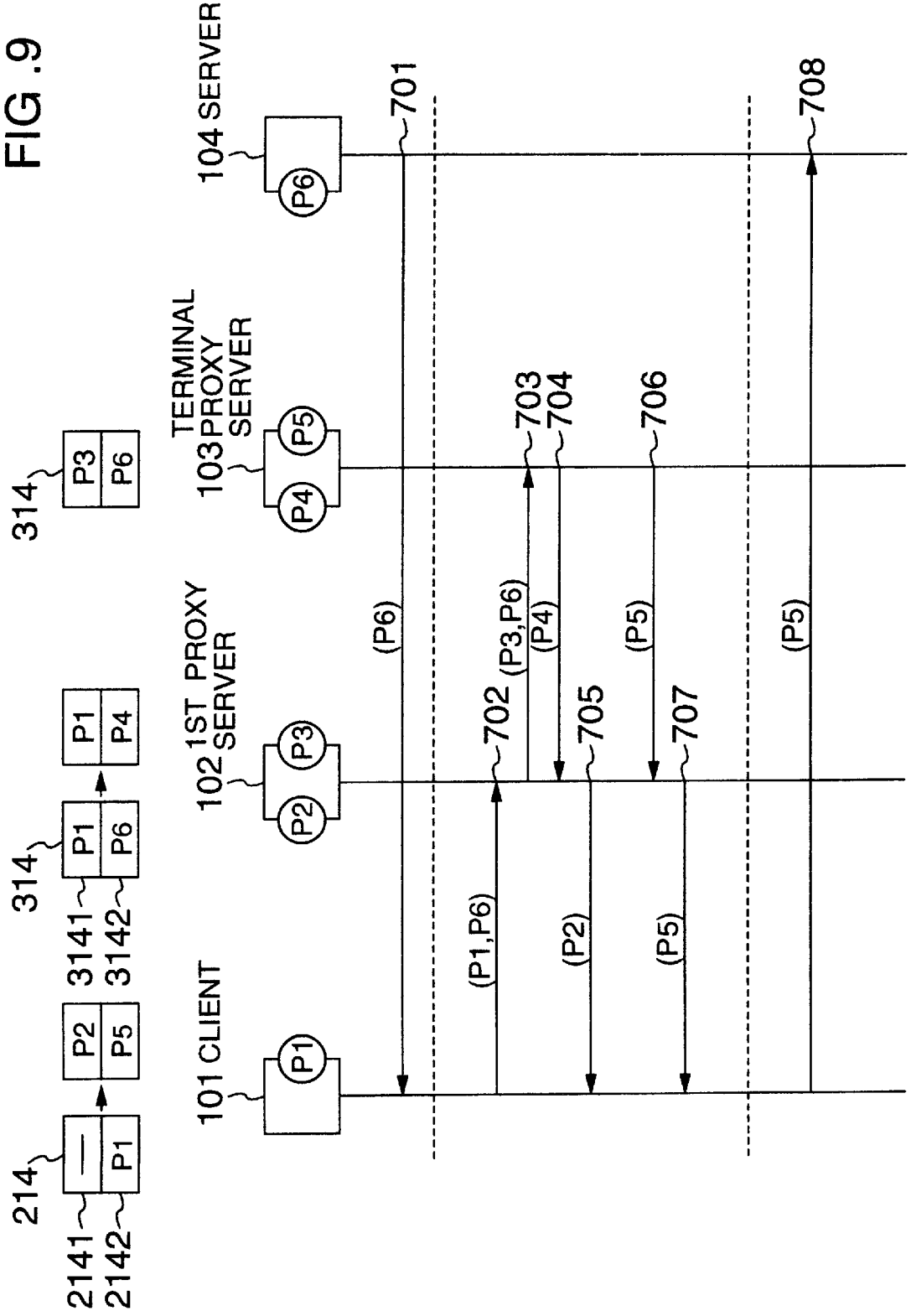
FIG. 9 is a diagram showing a concrete example of the communication sequence in accordance with the first embodiment of the present invention.

In FIG. 9, each of communication procedures 701 to 709 indicates a communication of one or more packets. P1 to P5 stand for port numbers assigned for connectionless communication by the respective computers. The sever computer 104 assigns port number P6 to communicate with the proxy server 103 and the client computer 101 assigns port number P1 for communication with the proxy server 102. The proxy server 102 assigns port numbers P2 and P3 respectively for communications with the client computer 101 and the proxy server 103. The proxy server 103 assigns port numbers P4 and P5 to communicate respectively with the proxy server 102 and the server computer 104. In the chart, IP addresses (communication addresses) to be communicated and recorded in a table are not shown for simplification of explanation.

In the procedure 701, port number P6 and the communication address of the server computer 104 are first reported from the computer 104 to the client computer 101 through the control connection. In the procedure 702, port number P6 and the communication address of the server computer 104 and port number P1 and the communication address of the client computer 101 are notified from the computer 101 to the proxy server 102 through an ordinary connection. Similarly, in the procedure 703, port number P6 and the communication address of the server computer 104 and port number P3 and the communication address of the proxy server 102 are sent from the server 102 to the proxy server 103. In the procedure 704, port number P4 and the communication address of the proxy server 103 are sent therefrom to the proxy server 102. In the procedure 705, port number P2 and IP address of the proxy server 102 are passed therefrom to the client computer 101. In the procedures 706 and 707, port number P5 and the communication address of the proxy server 103 are sent therefrom to the proxy server 102; moreover, these items are further transferred therefrom to the client computer 101.

In the communication procedure 708, port number P5 and the communication address of the proxy server 103 are sent from the client computer 101 to the server computer 104. Through the procedures above, the computers 102 to 104 can acquire port numbers and communication addresses of partner computers to be connected thereto.

The mutual authentication and access control, which will be described later, are accomplished in communication procedures 702 and 703. The access control may be carried out in procedures 704 and 705 in which the communication is achieved substantially in a reverse direction. Moreover, the mutual authentication and access control may be carried out in procedure 701.

In communication procedures 701 to 708, port numbers and IP addresses shown in FIG. 9 are stored in the port number record table 214 of the client computer 101 and the port number record tables 314 respectively of the proxy servers 102 and 103. When a connectionless data transmission is conducted from the client computer 101 to the server computer 104 and vice versa, the record tables 214 and 341 supply information of IP addresses and port numbers as next data transfer destinations. Namely, the data is transferred in accordance with the information.

Figure 10:
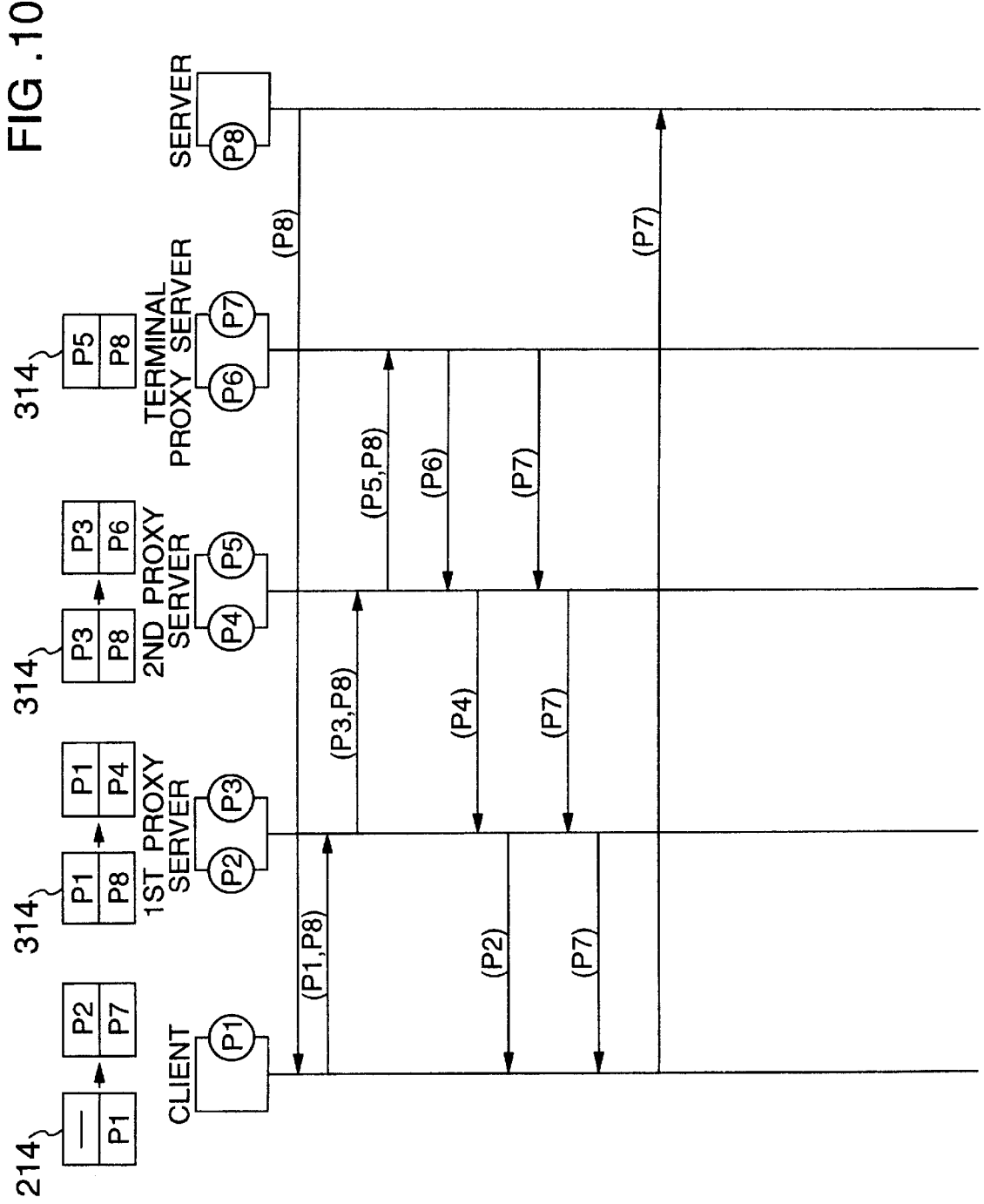
FIG. 10 is a specific example of the communication sequence in a case in which three proxy servers exist in a system in accordance with the present invention.

FIG. 10 shows a system example including three proxy servers on the transmission route. Even if three or more proxy servers are arranged, the required port number can be similarly attained through the exchange operation.

Subsequently, description will be given of processing executed in each computer on the route when the client computer 101 communicates with the server computer 104.

Figure 7:
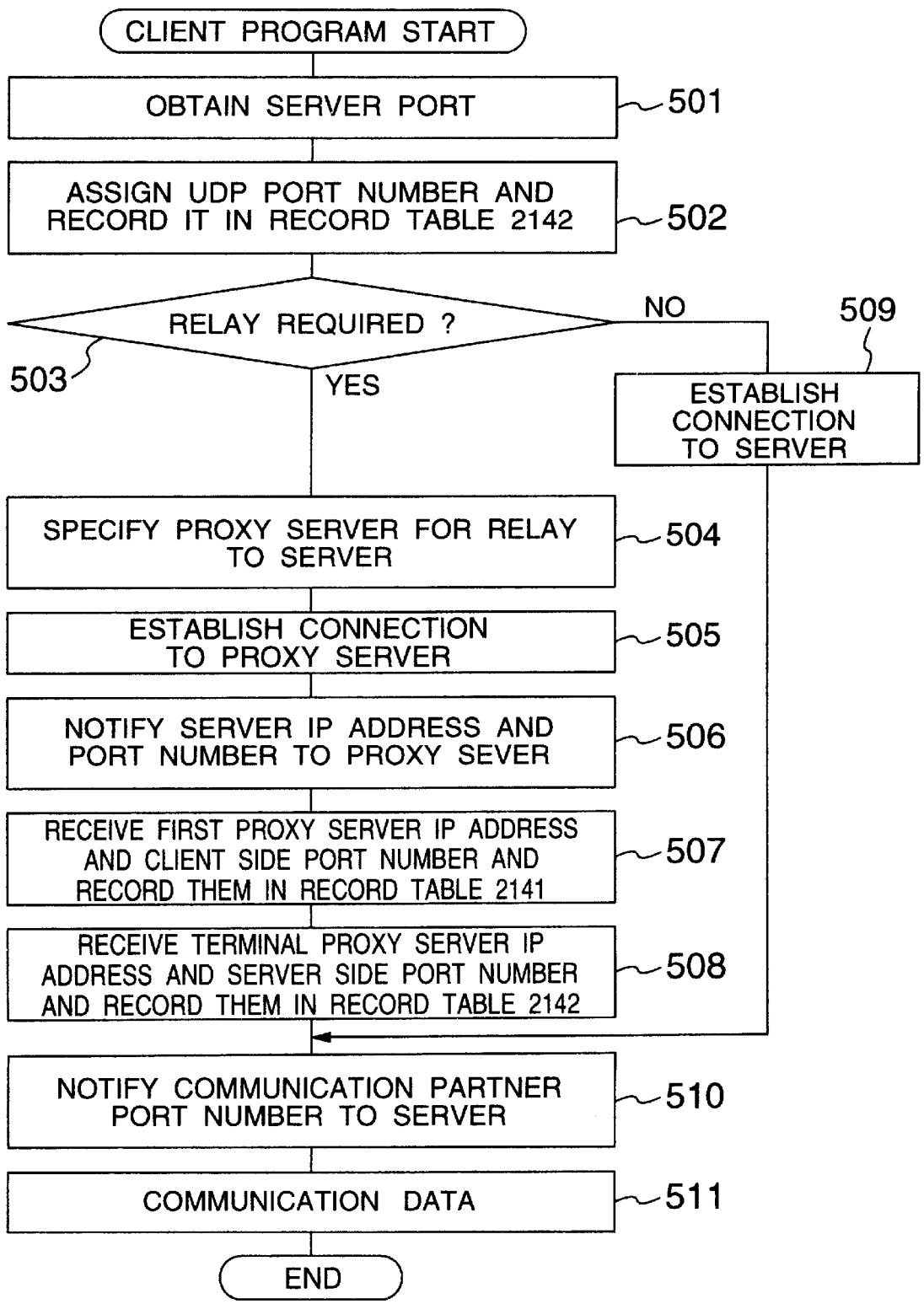
FIG. 7 is a general flow of a communication program of a client computer in accordance with the first embodiment of the present invention.

FIG. 7 is a general flowchart showing processing conducted by the client computer 101 in accordance with a communication program in the communication with the server computer 104. The flowchart corresponds to the operation of the client computer 101 in the sequence charts shown in FIGS. 9 and 10. In the sequence charts, the port number record table 214 in the memory of the client 101 is historically shown to illustratively present the rewriting of the contents thereof.

Returning to FIG. 7, a port number and an internet protocol (IP) address assigned by the server 104 for a connectionless communication are first acquired from the server 104 by the communication program of the client 101 through a control connection for the connection-oriented communication (step 501). Next, the program assigns a port number of the own computer 101 for connectionless communication and then stores the assigned port number in the port number record table 2142 (step 502). The program then checks to determine whether or not a relay operation of a proxy server is required (step 503). If not required, the program directly establishes connection to the server 104 (step 509). Whether or not a relay operation of a proxy server is required is determined as follows. The program checks the relay route information record area 211. When the destination IP address exists therein, the program determines that the relay operation is required.

When the relay is necessary, processing of steps 504 to 508 is executed in place of step 509. The program first refers to the area 211 to determine a proxy server 102 for the relay to the server 104 (step 504) and establishes connection to a proxy server program 341 running on the proxy server 102 (step 505). The program sends the communication address and the port number of the server 104 obtained in step 501 to the connected server program 341 (step 506). Subsequently, the program receives a client side port number and a communication address assigned by the first proxy server from the proxy server program 341 to record the received items in the port number record table 2141 (step 507). Additionally, the program receives a server side port number and a communication address of the proxy server program 341 on the terminal proxy server 103 linked with the server 104 to record the received information items in the port number record table 2142 (step 508).

Next, the program notifies the port number and communication address recorded in the table 2142 to the server 104 via the control connection (step 510). Thereafter, the program conducts a connectionless packet communication with the server 104 by specifying the connection partner port number and communication address recorded in the table 2141 (step 511).

The processing flow above is shared among all communication programs 241 running on the client computers 101. For example, when UNIX operating system (UNIXOS) is utilized, the process described above can be incorporated in the communication library. More specifically, Socket library functions including "sendto" and "receivefrom" can incorporate the process.

Figure 8:
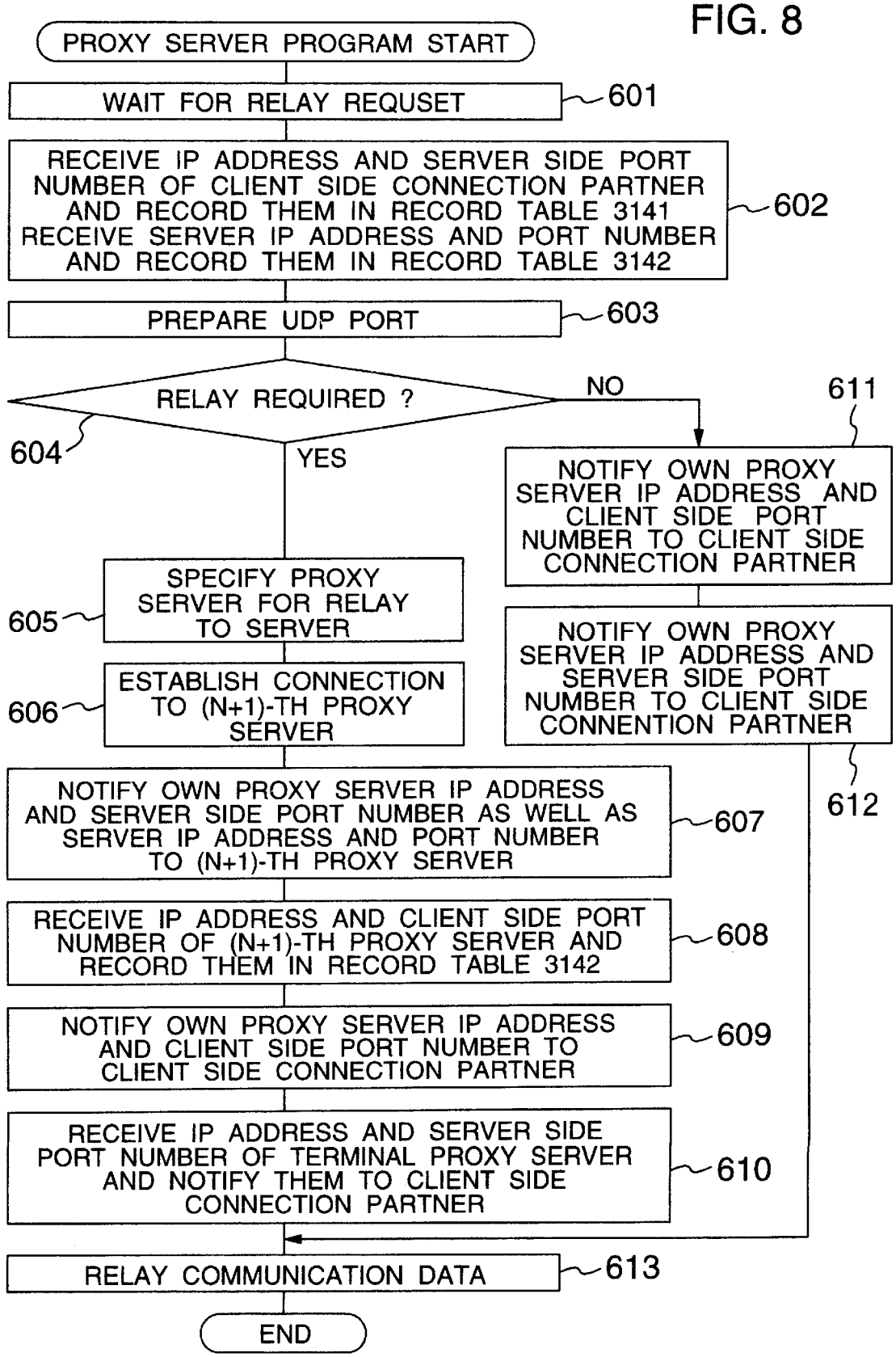
FIG. 8 is a diagram showing a general flow of a communication program of a proxy server in accordance with the first embodiment of the present invention.

FIG. 8 shows in a general flowchart the relay processing executed by the N-th proxy server in accordance with the proxy server program 341 in the communication between the client 101 and the server 104.

The flowchart corresponds to the operation of any proxy server in the sequence charts shown in FIGS. 9 and 10. In the sequence charts, the port number record table 314 in the memory of the proxy server is presented to illustratively show the rewriting of the contents thereof.

Returning to FIG. 8, the program 341 of the Nth proxy server waits for a connectionless communication data relay request from a client computer or any other proxy server (step 601). On receiving a relay request, the program establishes connection to a client side communication partner having sent the request and receives a connection partner IP address and a server side port number as well as an IP address and a port number of the server 104 to record the received items respectively in the tables 3141 and 3142 (step 602). Next, the program assigns a connectionless communication port number for each of the connection partners on the client and server sides (step 603). The program then refers to the relay route information record area 311 and thereby checks to determine whether or not a relay operation of another proxy server is necessary in the communication with the server 103 (step 604).

When the relay through another proxy server is necessary, the program executes processing of steps 605 to 610 and step 613 is executed. The program first refers to the area 311 to specify another proxy server (the proxy server 103 when viewed from the proxy server 102) for the relay operation (step 605) and establishes connection to a proxy server program 341 running on the (N+1)-th proxy server 102 thus specified (step 606).

The program then transmits the IP address and the assigned server side port number of the own proxy server, and the communication address and the port number which are obtained in step 602 and which are recorded in the area 3142 to the (N+1)-th proxy server program 341 connected in step 606 (step 607). From the (N+1)-th proxy server program 341, the program receives a port number and a communication address which are assigned by the (N+1)-th proxy server program 341 for a client side connection partner (i.e., the N-th server) and then records these items in the port number record area 3142 (step 608). The program notifies an IP address and a client side port number of the N-th proxy server to the client side connection partner (step 609). From the (N+1)-th proxy server program 341, the program receives a port number and a communication address which are assigned by a terminal proxy server (103) to be connected to the server computer 104 for the server computer 104 and notifies the received information directly to the client side connection partner (step 610).

Information received in steps 602, 608, and 609 is recognized as a response to the relay request by the own proxy server program 341 and is discriminated from other information. For this purpose, the received information may includes, for example, an identifier indicating "response".

Receiving thereafter any packet with specification of the IP address and the port number of the own proxy server, the program rewrites the port number and the communication address according to the table 314 to transfer these packets to the connection partner in the connectionless communication (step 613).

When it is determined in step 604 that the relay via another proxy server is unnecessary, namely, when the own proxy server is to be linked with the server computer 104, the program executes processing of steps 611 and 612.

The program transmits to the connection partner the port number assigned by the own proxy server for the client side connection partner (step 611). The program then sends the port number assigned to the server computer 104 in step 603 to the client side connection partner (step 612). After this point, the program transfers packets through the processing of step 613.

Thanks to the mutual authentication between the computers and the access control by proxy servers, the network communication system can be improved in security. For the mutual authentication, there may be adopted, for example, the ISO/IEC9798 authentication.

The mutual authentication between the computers 101 to 104 is processed in a plurality of steps when connection is established therebetween. Between the client computer 101 and the proxy server 102, the authentication processing is carried out respectively in steps 505 and 602 in the flowcharts of FIGS. 7 and 8, respectively. Concretely, referring to the example of FIG. 5, the proxy serve 102 first sends an identifier (fw1) of the own computer and a random number to the client computer 101. According to the received identifier, the client computer 101 acquires an authentication common key 1201 which is common to the proxy server 102 and which is beforehand stored in the authentication information table 2441 to encrypt the random number in accordance with the common key 1201. The client computer 101 returns the encrypted result and its computer identifier (c11) to the proxy server 102. The proxy server 102 then obtains the authentication common key 1201 which is common to the client computer 101 and which is stored in the authentication information table 3431 in advance to decrypt the encrypted random number by use of the common key 1201. When the transmitted random number matches the decrypted random number, the authentication is assumed to have been normally completed and control is passed to the subsequent processing. Otherwise, it is assumed that the authentication is not completed and the connection is disconnected. For the mutual authentication, the processing above is carried out by reversing the authenticating partner and the partner to be authenticated.

Similarly, the authentication between the proxy servers is accomplished in steps 602 and 606 of FIG. 8. In the example of FIG. 5, the proxy serve 103 transmits a random number to the proxy server 102. The proxy serve 102 encrypts the received random number in accordance with an authentication common key 1202 common to the proxy server 103 and then returns the encrypted random number to the proxy server 103. Using the authentication common key 1202 common to the proxy server 102, the proxy server 103 decrypts the received number. Only when the transmitted random number is equal to the decrypted random number, the authentication is assumed to be completed. Also in this situation, the mutual authentication is accomplished by conducting the processing above in a reversed state in which the authenticating partner and the partner to be authenticated are exchanged with each other.

The proxy server conducts the access control immediately after the authentication in step 602 of FIG. 8. For the access control, the proxy server program of each proxy server acquires from the received packet a user identifier and a communication address of the user operating the client computer 102 and continues the processing only when the obtained items matches information recorded in the access control table 344.

(3) Second Embodiment

Referring now to FIGS. 11 to 15, description will be given of an alternative embodiment of the network communication system in accordance with the present invention.

In the system of this embodiment, the communication sequence, namely, communication program processing of the client computer and relay program processing of the proxy server are different from those of the first embodiment. More specifically, the second embodiment advantageously enhances the authentication processing and the access control.

FIG. 14 illustratively shows in a sequence chart a specific example of communication achieved though operation presented in the flowcharts (FIGS. 11 and 12) of the embodiment. In FIG. 14, port numbers P1 to P6 are assigned to the computers 101 to 104 in a similar manner as for FIG. 9.

In a communication procedure 1001, the server computer 104 notifies port number P6 and a communication address thereof to the client computer 101. The client 101 reports the received port number P6 and communication address and its computer port number P1 and a communication address to the proxy server 102 in a communication procedure 1002. In a reverse manner, the client computer 101 receives from the proxy server 102 a communication address and port numbers P2 and P3 thereof in communication procedures 1003 and 1004. In a following procedure 1005, the client 101 again transmits port number P6 and the communication address of the server computer 104 and port number P3 and the communication address received in a procedure 1004 such that the transmitted information is relayed by the proxy server 102 to the proxy server 103. In procedures 1006 and 1008, the server 103 sends the own communication address and port numbers P4 and P5 therefrom. These information items are relayed by the proxy serve 102 to the client computer 101 in procedures 1007 and 1009. Due to the communication procedures above, the computers can obtain port numbers and communication addresses of computers respectively connected thereto.

For the mutual authentication and the access control operation, the mutual authentication is achieved between the client computer 101 and the proxy server 102 in the procedure 1002 and between the client 101 and the proxy server 103 in the procedure 1005. Additionally, the proxy serve 102 carries out the communication access control of the client 101 according to the authentication result in the procedure 1002 and the proxy serve 103 also accomplishes the communication access control of the client 101 in accordance with the authentication result in the procedure 1005. Thanks to the mutual authentication and access control described above, the network communication system can be advantageously improved in security.

After the connectionless communication is commenced, in the communication of the proxy server (103) coupled with the client computer 101 and the server computer, communication data can be encrypted and decrypted in accordance with the common key used in the mutual authentication. That is, when the encryption and decryption are respectively carried out on the transmission and reception sides, the system can be much more strengthened with respect to security.

FIG. 15 shows a configuration including three proxy servers on the communication path. Even when there are arranged three or more proxy servers, the port number acquisition and exchange can be achieved in a similar fashion.

Figure 11:
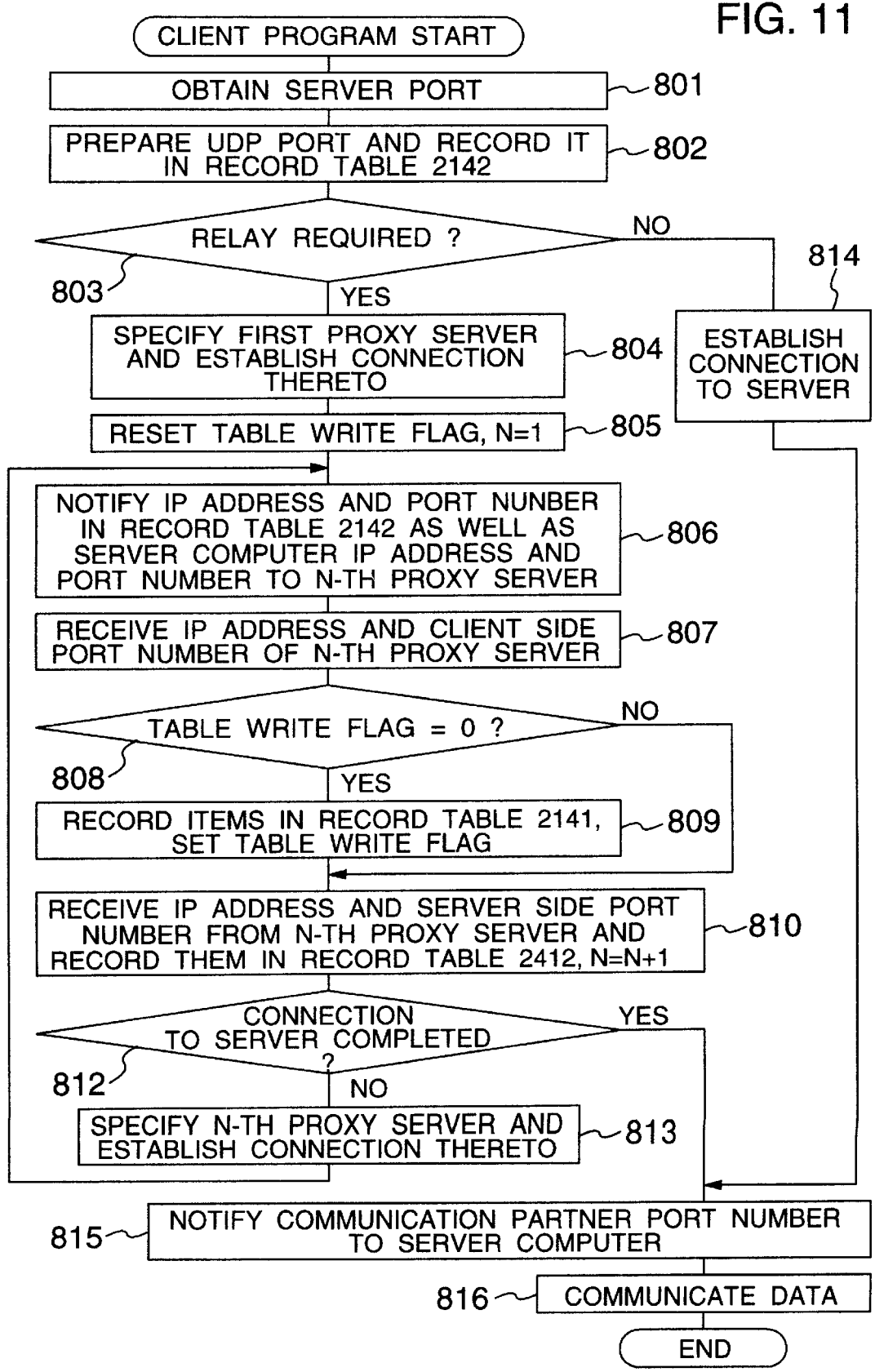
FIG. 11 is a general flow of a communication program of a client computer in accordance with a second embodiment of the present invention.

FIG. 11 shows in a flowchart a general flow of processing executed by the communication program of the client computer 101 in communication with the serve computer 104.

This flow chart corresponds to the operation of the client computer 101 in the sequence charts of FIGS. 14 and 15.

The communication program of the client 101 first acquires a port number and a communication address assigned by the server computer 104 for the connectionless communication from the server computer 104 via a control connection (step 801). The program then assign its own port number for the connectionless communication and stores the acquired port number in the port number record table 2142 (step 802). The program then refers to the relay route information record area 211 to determine whether or not a relay by another proxy server is required (step 803). If the relay is unnecessary, the program establishes connection directly to the server computer (step 814).

When the relay is required, the program executes processing of steps 804 to 813 in place of step 814. The program first refers to the record area 211 to specify a first server (102) for the relay to the server compute 104 and establishes connection to a proxy server program 341 running on the specified proxy server (step 804). The program then resets a table write flag (step 805).

Next, the program relays to the connected proxy server program 341 the IP address and the port number in the record table 2142 and the communication address and the port number of the server computer 104 obtained in step 801 (step 806). The program then receives a client side port number and a communication address from the program 341 of the connected proxy server (step 807). In the processing, when the information is generated by the terminal proxy server coupled with the server computer 104, the program also sends connection completion information. Otherwise, the information generating computer also sends next proxy server connection information for specifing and connecting the next proxy server which conducts the relay operation to the server computer 104.

The program next makes a check to determine whether or not the value of the table write flag is zero (step 808). If this is the case, the program records the received port number in the port number record area 2141 and set the table write flag (step 809). The program then stores the server side port number and the communication address received from the connected proxy server in the port number record table 2142 (step 810).

The table write flag is used to control so that the write operation of the record table 2141 is performed only when the first proxy server information is received. The program judges whether or not the connection to the proxy server has been completed for connection to the server computer 104 in accordance with presence or absence of the reception of connection completion information (step 812). If not completed, the program specifies the next proxy server on the basis of the next proxy server connection information and establishes connection thereto (step 813). The program repeatedly executes processing of steps 806 to 812.

If the connection has been completed, the program notifies the port number and the communication address in the record area 2142 to the server computer 104 via the control connection (step 815). After this point, the program conducts a connectionless packet communication with the server computer 104 by specifying the port number and the communication address of the connection partner which are recorded in the record table 2141 (step 816).

Figure 12:
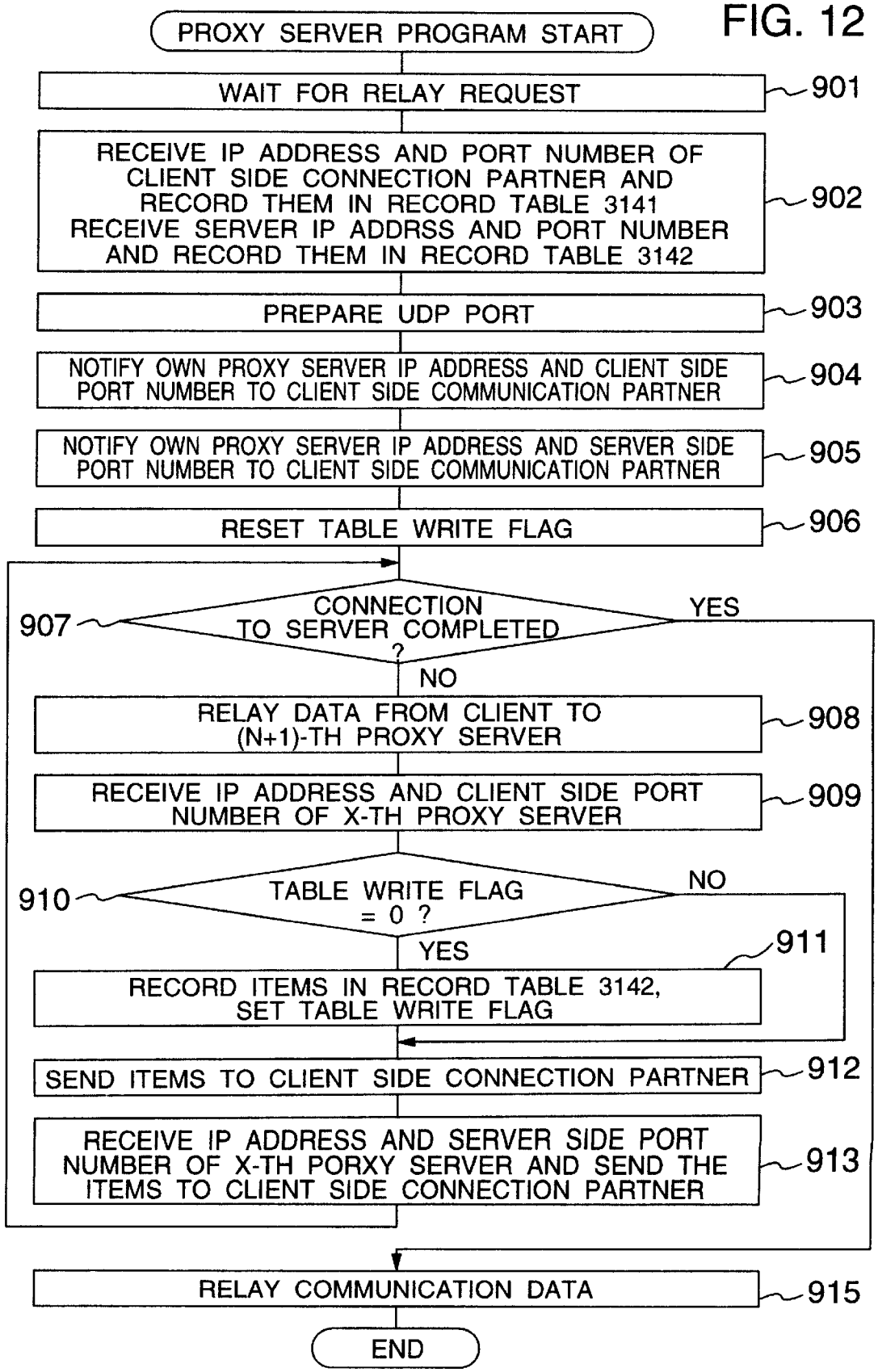
FIG. 12 is a diagram showing a general flow of a communication program of a proxy server in accordance with the second embodiment of the present invention.

FIG. 12 is a flowchart showing a general transit processing executed by the N-th proxy server according to the proxy server program 341 for the transit operation in communication between the client computer 101 and the server computer 104. This flowchart corresponds to operation of any proxy server in the sequence diagrams shown in FIGS. 14 and 15.

The program 341 of the N-th proxy server first awaits a relay request of connectionless communication data from a client computer or another proxy server (step 901). The program receives an IP address and a server side port number of a client side connection partner and an IP address and a port number of the server computer to record these items respectively in the record tables 3141 and 3142 (step 902). Thereafter, the program assigns a connectionless communication port number for each connection partner on the client and server sides (step 903) and notifies the port number to the client side connection partner together with a IP address (steps 904 and 905). In this situation, the program refers to the relay route information storage area 311 to determine whether or not a relay by another proxy server is required for communication with the server computer 104. If not necessary, the program also sends connection completion information. If the relay is required, the program also sends next proxy server connection information for connection of the next proxy server, i.e., the (N+1)-th proxy server. The program then resets the table write flag (step 906).

In a case in which the relay via another proxy server is required, the program executes processing of steps 908 to 914.

The program establishes connection to the (N+1)-th proxy server to relay data sent from the client to the (N+1)-th proxy server (step 908). Subsequently, the program receives an IP address and a client side port number of an x-th ($x \geq N+1$) from the (N+1)-th proxy server (step 909). Only when the table write flag is zero (step 910), the program stores the received item in the port number record table 3142 and set the table write flag (step 911) and then transmits the information to the client side connection partner. Thanks to the usage of the table write flag, only the information of the adjacent (N+1)-th proxy server is recorded in the table. Similarly, the program received an IP address and a server side port number of the x-th proxy server ($x \geq N+1$), sends the information to the client side connection partner (step 913). Information received in steps 902, 909, and 913 is recognized as a response to the relay request in step 901 and is discriminated from other information. The information additionally includes the connection completion information or the next proxy server connection information. Depending on presence or absence of the reception of connection completion information, the program determines whether or not the connection to the proxy server has been completed for connection to the server computer 104 (step 907). If not completed, the program repeatedly executes the processing beginning at step 908.

After the completion of connection, for any packet sent with the port number and the communication address of the own proxy server, the program rewrites the port number and the communication address in accordance with the port number record table 314 to transfer the resultant packet via the connectionless communication (step 915).

Figure 13:
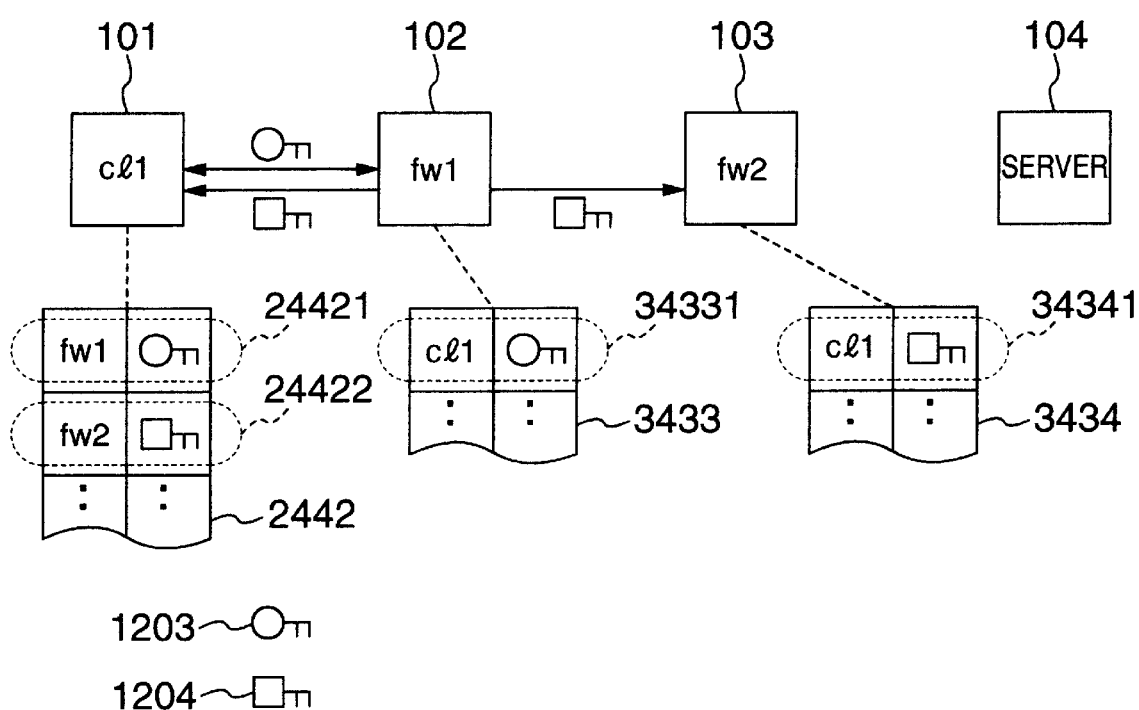
FIG. 13 is a diagram for explaining structure of an authentication information table and authentication processing in accordance with the second embodiment of the present invention.
Figure 16A:
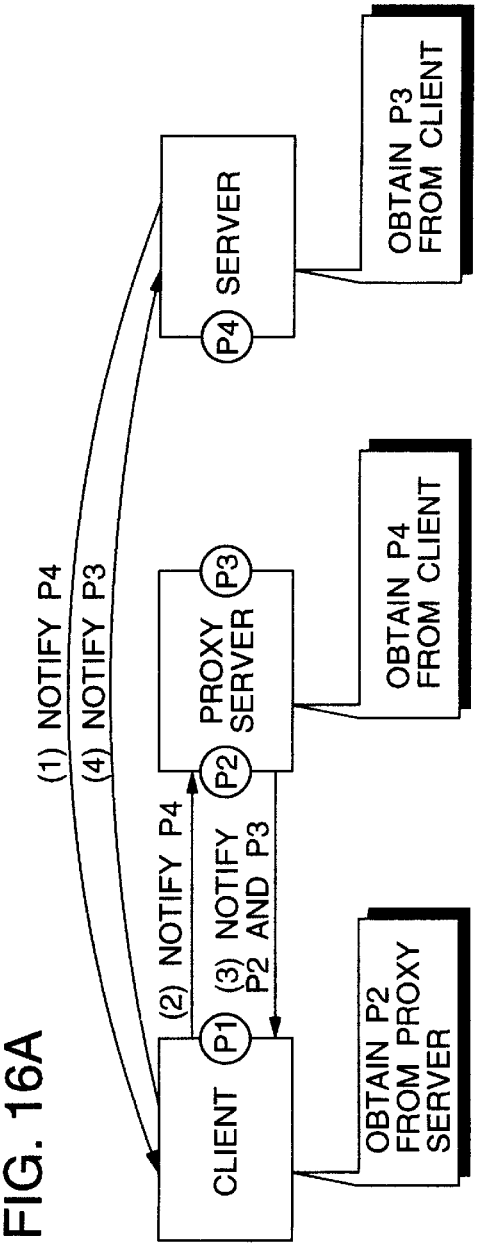
FIGS. 16A and 16B are diagrams for explaining drawbacks in the conventional system.
Figure 16B:
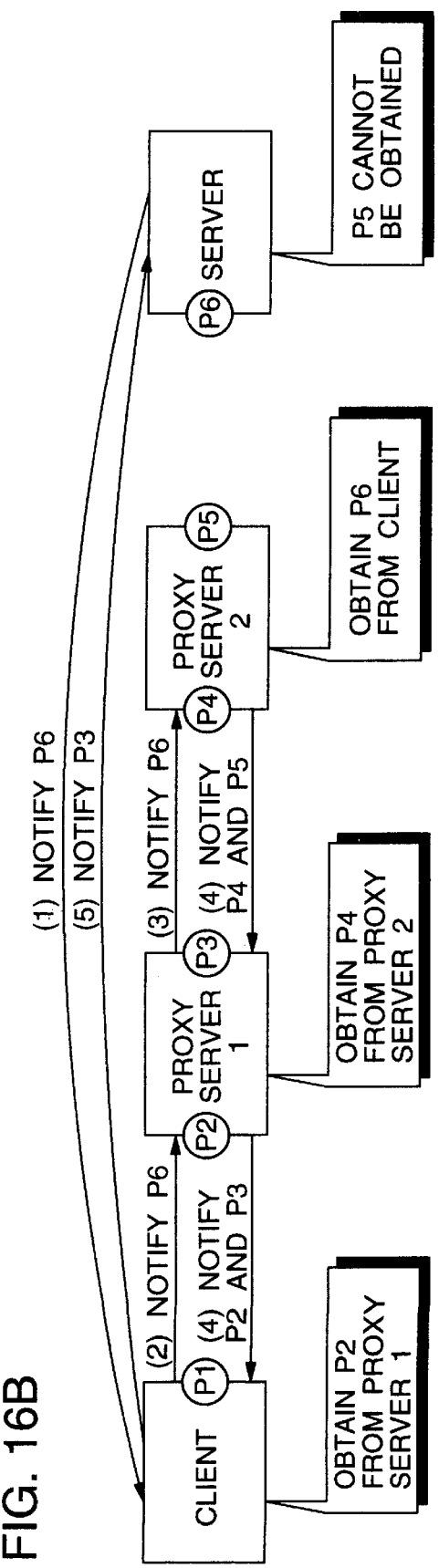

Also in this embodiment, the network communication system is advantageously enhanced with respect to security by the mutual authentication and the access control achieved through steps in a similar manner as for the first embodiment. However, the second embodiment varies from the first embodiment in that the mutual authentication and the access control are carried out between the client computer 101 and the respective proxy servers. Therefore, the client computer 101 shares the authentication common key 1203 with the proxy server 102 and another common key 1204 with the proxy server 103 as shown in FIG. 13. Using the common key shared with the associated proxy server, the program conducts the authentication processing. The mutual authentication processing is executed in the connection processing of steps 805 and 813 in the flowchart of FIG. 11 and in steps 902 of the flowchart of FIG. 12. The access control processing is carried out immediately after the authentication is achieved in step 902 of FIG. 12. Each proxy server relays the communication between the client computer 102 and another proxy server only when the mutual authentication and the access controls are completed for the client computer 102.

The invention has been described with reference to the preferred and alternative embodiments. Obviously, modifications and alternations will occur to those of ordinary skill in the art upon reading and understanding the present invention. It is intended that the invention be construed as including all such modifications and alternations in so far they come with the scope of the appended claims or the equivalent thereof.

What is claimed is:

1. A method of conducting a connectionless communication in a network communication system including a client computer, a server computer, and a plurality of proxy server computers being disposed on a transmission path between the client and server computers and forming firewalls in which each computer carries out communication with specification of a communication address thereof and a port number dynamically assigned by the computer, comprising:

step (a) that the server computer transmits own communication address and own port number to the client computer;

step (b) that the client computer transmits own communication address and own port number as well as the received communication address and port number of the server computer to a first adjacent proxy server computer;

step (c) that the N-th proxy server computer (N≧1) transmits own communication address and own server side port number and the received communication address and port number of the serve computer to an (N+1)-th proxy server computer adjacent thereto on the server computer side;

step (d) that step (c) is repeatedly executed while incrementally increasing N until the (N+l)-th proxy server becomes a terminal proxy server computer;

step (e) that the terminal proxy server computer transmits own communication address and own client side port number as well as own communication address and own server side port number to an N-th proxy serve computer adjacent thereto on the client side;

step (f) that the N-th proxy serve computer transmits own communication address and own client side port number as well as a communication address and a server side port number of the terminal proxy server computer to an (N−1)-th proxy serve computer adjacent thereto on the client side for N≧2 or the client computer for N=1;

step (g) that step (f) is repeatedly executed while decrementing N until N becomes one;

step (h) that the client computer transmits the communication address and the server side port number of the terminal proxy server computer to the server computer; and step (i) that a connectionless communication is commenced after all computers acquire computer addresses and associated port numbers of adjacent computers thereof.

2. A connectionless communication method in accordance with claim 1. wherein the steps (a) to (h) are carried out in a connection-oriented communication.

3. A connectionless communication method in accordance with claim 2, wherein:

the network communication system utilizes TCP/IP;

the connection-oriented communication is carried out by use of TCP; and the connectionless communication is accomplished by using UDP.

4. A connectionless communication method in accordance with claim 3, wherein:

the communication between the client and server computers are conducted by using a TCP control connection.

5. A connectionless communication method in accordance with claim 1, further including the step of accomplishing mutual authentication when connection is established between adjacent computers of the steps (b) and (c).

6. A connectionless communication method in accordance with claim 5, further including the step of conducting an access control when the mutual authentication is completed.

7. A method, in a network communication system including a client computer, a server computer, and a plurality of proxy server computers configuring firewalls, for conducting a connectionless communication in each of the proxy server computers comprising the steps of:

(a) receiving from a client side computer a communication address and a server side port number thereof as well as a communication address and a port number of a server computer;

(b) assigning a connectionless communication port number;

(c-1) when own computer is a terminal proxy server computer, transmitting own communication address and own client side port number as well as own communication address and own server-side port number to a computer adjacent thereto on the client side;

(c-2) when own computer is other than a terminal proxy server computer, transmitting own communication address and own server side port number as well as a communication address and a port number of a server computer to a proxy server computer adjacent thereto on the server side;

transmitting own communication address and own client side port number as well as a communication address and a server side port number of a terminal proxy server computer to a computer adjacent thereto on the client side;

(d) storing in a table a communication address and an associated port number of each of computers adjacent thereto on both sides; and (e) relaying connectionless communication data in accordance with information stored in the table.

8. A method, in a network communication system including a client computer, a server computer, and a plurality of proxy server computers configuring firewalls, for conducting a connectionless communication in the client computer, comprising the steps of:

(a) receiving from a server computer a communication address and a port number of the server computer;

(b) assigning a connectionless communication port number;

(c) transmitting own communication address and own port number and the communication address and the port number received from the server computer to an adjacent proxy server computer;

(d) receiving a communication address and a client side port number of the adjacent proxy computer and a communication address and a server side port number of a terminal proxy server computer;

(e) transmitting the communication address and the server side port number of the terminal proxy server computer to the server computer; and (f) commencing a connectionless communication in accordance with received information.

9. A method of conducting a connectionless communication in a network communication system including a client computer, a server computer, and a plurality of proxy server computers being disposed on a transmission path between the client and server computers and forming firewalls in which each computer carries out communication with specification of a communication address thereof and a port number dynamically assigned by the computer, comprising:

step (a) that the server computer transmits own communication address and own port number to the client computer;

step (b) that the client computer transmits own communication address and own port number as well as the received communication address and port number of the server computer to a first adjacent proxy server computer;

step (c) that the first proxy server computer transmits own communication address and own client side port number as well as own communication address and own server side port number to the client computer;

step (d) that the client computer transmits the received communication address and the received server side port number of an N-th proxy server computer (N≧1) as well as the received communication address and the received port number of the server computer to an (N+1)-th proxy server computer;

step (e) that the (N+1)-th proxy server computer transmits own communication address and own server side port number as well as own communication address and own client side port number via the first to N-th proxy server computers to the client computer;

step (f) that steps (d) and (e) are repeatedly executed by incrementally increasing N until the (N+1)-th proxy server computer becomes a terminal proxy server computer;

step (g) that the client computer transmits a communication address and a server side port number of the terminal proxy server computer to the server computer; and step (h) that a connectionless communication is commenced after all computers acquire a communication address and an associated port number of each of the computers adjacent thereto.

10. A connectionless communication method in accordance with claim 9, wherein the steps (a) to (g) are carried out in a connection-oriented communication.

11. A connectionless communication method in accordance with claim 10, wherein:

the network communication system utilizes TCP/IP;

the connection-oriented communication is conducted by use of TCP; and the connectionless communication is achieved by using UDP.

12. A connectionless communication method in accordance with claim 11, wherein:

the communication between the client and server computers are conducted by using a TCP control connection.

13. A connectionless communication method in accordance with claim 9, further including the step of accomplishing mutual authentication when connection is established between the client computer and the proxy server computer of the steps (b) and (d).

14. A connectionless communication method in accordance with claim 13, further including the step of conducting an access control when the mutual authentication is completed.

15. A method, in a network communication system including a client computer, a server computer, and a plurality of proxy server computers configuring firewalls, for conducting a connectionless communication in each of the proxy server computers, comprising the steps of:

(a) receiving from a client side computer a communication address thereof and a server side port number thereof as well as a communication address and a port number of a server computer;

(b) assigning a connectionless communication port number;

(c) transmitting own communication address and own client side port number as well as own communication address and own server side port number to a computer adjacent thereto on the client side;

(d) when own computer is other than a terminal proxy server computer, (d1) relaying data sent from the client computer to a proxy server computer adjacent to the own computer on the server side;

(d2) receiving a communication address and a client side port number of an N-th proxy server computer sent from the adjacent proxy server computer on the server side and a communication address and a server side port number of the N-th proxy server computer and transmitting the received communication addresses and port numbers to an adjacent computer on the client side;

(d3) repeatedly executing the steps (d1) and (d2) while incrementally increasing N until the N-th proxy server computer becomes a terminal proxy server computer;

(e) storing in a table a communication address and an associated port number of each of computers adjacent thereto on both sides; and (f) relaying connectionless communication data in accordance with information stored in the table.

16. A method, in a network communication system including a client computer, a server computer, and a plurality of proxy server computers configuring firewalls, for conducting a connectionless communication in the client computer, comprising the steps of:

(a) receiving from a sever computer a communication address and a port number thereof;

(b) assigning a connectionless communication port number;

(c) transmitting own communication address and own port number as well as the communication address and the port number received from to the server computer to a first proxy server computer adjacent thereto;

(d) receiving a communication address and a server side port number of the first proxy server computer and a communication address and a client side port number of the first proxy server computer;

(e) transmitting the communication address and the server side port number of the first proxy server computer and the communication address and the port number of the server computer to a second proxy server computer;

(f) receiving a communication address and a server side port number of an N-th proxy server computer (N≧2) and the communication address and a client side port number of the N-th proxy server computer;

(g) transmitting the communication address and the server side port number of the N-th proxy server computer and the communication address and the port number of the server computer to an (N+1)-th proxy server computer;

(h) repeatedly executing the steps (f) and (g) while incrementally increasing N until the (N+1)-th proxy server computer becomes a terminal proxy server computer;

(i) transmitting the communication address and the server side port number of the terminal proxy server computer to the server computer; and (j) commencing a connectionless communication in accordance with received information.

17. A computer-readable medium containing instructions for causing a server computer to perform connectionless communication in a network communication system including a client computer, a server computer, and a plurality of proxy server computers configuring firewalls therebetween, by the steps (a) to (e) described in claim 7.

18. A computer computer-readable medium containing instructions for causing a server computer to perform connectionless communication in a network communication system including a client computer, a server computer, and a plurality of proxy server computers configuring firewalls therebetween, by the steps (a) to (f) described in claim 8.

19. A computer computer-readable medium containing instructions for causing a server computer to perform connectionless communication in a network communication system including a client computer, a server computer, and a plurality of proxy server computers configuring firewalls therebetween, by the steps (a) to (f) described in claim 15.

20. A computer computer-readable medium containing instructions for causing a server computer to perform connectionless communication in a network communication system including a client computer, a server computer, and a plurality of proxy server computers configuring firewalls therebetween, by the steps (a) to (j) described in claim 16.

* * * * *